(12) United States Patent
Boday et al.

(10) Patent No.: US 9,598,284 B2
(45) Date of Patent: Mar. 21, 2017

(54) HIGH-PERFORMANCE, FILLER-REINFORCED, RECYCLABLE COMPOSITE MATERIALS

(71) Applicant: International Business Machines Corporation, Armonk, NY (US)

(72) Inventors: Dylan J. Boday, Austin, TX (US); Jeannette M. Garcia, San Leandro, CA (US); James L. Hedrick, Pleasanton, CA (US); Rudy J. Wojtecki, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/195,763

(22) Filed: Jun. 28, 2016

(65) Prior Publication Data

US 2016/0304348 A1 Oct. 20, 2016

Related U.S. Application Data

(60) Division of application No. 14/571,501, filed on Dec. 16, 2014, now Pat. No. 9,403,945, which is a continuation of application No. 14/452,011, filed on Aug. 5, 2014, now Pat. No. 9,255,172.

(51) Int. Cl.

| | | |
|---|---|---|
| C01B 31/02 | (2006.01) | |
| C08G 12/40 | (2006.01) | |
| C08K 7/06 | (2006.01) | |
| C08K 7/14 | (2006.01) | |
| C03C 13/00 | (2006.01) | |
| C08G 73/06 | (2006.01) | |
| C08J 11/00 | (2006.01) | |
| C08G 83/00 | (2006.01) | |
| C08L 61/22 | (2006.01) | |
| C08L 79/04 | (2006.01) | |
| C08K 9/04 | (2006.01) | |
| D01F 9/12 | (2006.01) | |

(52) U.S. Cl.
CPC ........ *C01B 31/022* (2013.01); *C01B 31/0213* (2013.01); *C03C 13/00* (2013.01); *C08G 12/40* (2013.01); *C08G 73/065* (2013.01); *C08G 73/0638* (2013.01); *C08G 73/0644* (2013.01); *C08G 83/001* (2013.01); *C08J 11/00* (2013.01); *C08K 7/06* (2013.01); *C08K 7/14* (2013.01); *C08K 9/04* (2013.01); *C08L 61/22* (2013.01); *C08L 79/04* (2013.01); *D01F 9/12* (2013.01); *C08J 2379/04* (2013.01); *Y02P 20/582* (2015.11)

(58) Field of Classification Search
CPC .............. C08G 73/0644; C08G 73/065; C08G 83/001; C08G 73/0638; C08G 12/40; C08J 11/00; C08K 9/04; C08K 7/06; C08K 7/14; C03C 13/00; C08L 61/22; C08L 79/04

See application file for complete search history.

(56) References Cited

U.S. PATENT DOCUMENTS

| | | |
|---|---|---|
| 2,889,277 A | 6/1959 | Hughes |
| 3,340,232 A | 9/1967 | Smith et al. |
| 3,598,748 A | 8/1971 | Hirosawa |
| 3,957,742 A | 5/1976 | Kveton |
| 4,106,904 A | 8/1978 | Oude Alink et al. |
| 4,224,417 A | 9/1980 | Hajek et al. |
| 4,225,481 A | 9/1980 | Wagner |
| 4,246,160 A | 1/1981 | Wagner et al. |
| 4,301,262 A | 11/1981 | Wagner et al. |
| 4,608,431 A | 8/1986 | Kohli |
| 4,868,253 A | 9/1989 | Hodgson et al. |
| 4,877,451 A | 10/1989 | Winnik et al. |
| 5,112,796 A | 5/1992 | Iannicelli |
| 5,674,377 A | 10/1997 | Sullivan, III et al. |
| 5,830,243 A | 11/1998 | Wolak et al. |
| 7,384,434 B2 | 6/2008 | Malfer et al. |
| 9,120,897 B1 | 9/2015 | Boday et al. |
| 9,243,107 B2 | 1/2016 | Hedrick et al. |
| 2009/0039018 A1 | 2/2009 | Jordi et al. |

(Continued)

FOREIGN PATENT DOCUMENTS

| | | |
|---|---|---|
| CN | 101265255 A | 9/2008 |
| EP | 2636697 A1 | 9/2013 |

(Continued)

OTHER PUBLICATIONS

Youssef Mansour, Making hardy plastics recyclable, Nature Middle East, Emerging Science in the Arab World, May 28, 2014, pp. 1-3.
Henri Ulrich et al., Reaction of Chloromethyl Ether with Primary Amines, May 1961, pp. 1637-1638.
Hemant S. Patel et al., Studies on Synthesis and Characterization of some Novel Aromatic Copolyesters based on s-Triazine, Iranian Polymer Journal, vol. 14, No. 12, 2005, pp. 1090-1098.

(Continued)

*Primary Examiner* — Alexander Kollias
(74) *Attorney, Agent, or Firm* — Patterson + Sheridan, LLP

(57) ABSTRACT

Polyhexahydrotriazine (PHT) and polyhemiaminal (PHA) materials form highly cross-linked polymers which can be used as binder resins in composite materials. A filler element functionalized with a primary amine group can be covalently bonded to the PHA/PHT polymer resins. Example filler elements include, without limitation, carbon nanotubes, silica materials, carbon and glass fibers, and nanoparticles. Filler materials are incorporated into polymeric materials to improve the mechanical strength or other characteristics of the polymeric material for various applications. Typical composite materials use thermosetting materials that, once set, are intractable. PHT and PHA materials can be reverted to starting materials by exposure to acids. Thus, composite components formed using these materials are recyclable.

17 Claims, 5 Drawing Sheets

(56) References Cited

U.S. PATENT DOCUMENTS

| | | | |
|---|---|---|---|
| 2010/0107476 A1 | 5/2010 | Cosimbescu | |
| 2012/0049308 A1 | 3/2012 | Nishimura et al. | |
| 2015/0104579 A1 | 4/2015 | Hedrick et al. | |

FOREIGN PATENT DOCUMENTS

| | | |
|---|---|---|
| GB | 928112 A | 6/1963 |
| GB | 1531578 A | 11/1978 |
| WO | 0166614 A2 | 9/2001 |
| WO | 0198388 A1 | 12/2001 |
| WO | 0226849 A1 | 4/2002 |

OTHER PUBLICATIONS

Fabian Suriano et al., Functionalized cyclic carbonates: from synthesis and metal-free catalyzed ring-opening polymerization to applications, Polymer Chemistry, The Royal Society of Chemistry, 2011, Received Jul. 6, 2010, Accepted Aug. 13, 2010, pp. 528-533.
Wang Yulan et al., Synthesis and Properties of Poly-1, 3, 5-Triazines, Polymer Communications, No. 2, 1984, pp. 117-123.
John Markoff, Error at IBM Lap Finds New Family of Materials, New York Times, May 15, 2014, 4 pages.
Jeanette M. Garcia et al., Recyclable, Strong Thermosets and Organogels via Paraformaldehyde Condensation with Diamines, Science AAAS, vol. 344, May 16, 2014, pp. 732-735.
D.R. Anderson et al., Thermally resistance polymers containing the s-triazine ring, Journal of Polymer Science Part A-1: Polymer Chemistry, vol. 4, Issue 7, pp. 1689-1702, 1966.
T. Okita, Filter method for the determination of trace quantities of amines, mercaptans, and organic sulphides in the atmosphere, Atmospheric Environment (1967), vol. 4, Issue 1, Jan. 1970, pp. 93-102.
Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.
Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.
Ferrar, "Reactions of Formaldehyde With Aromatic Amines," J. Appl. Chem, 14, 1964, 389-399.
Geng, et al., "Nanoindentation behavior of ultrathin polymeric films," Polymer 46 (2005) 11768-11772; Available online Oct. 19, 2005.
Hiller, et al., "Laser-engravable hexahydrotriazine polymer networks," Mat Res Innovat (2002) 6:179-184.
Oliver, et al. "Measurement of hardness and elastic modulus by; instrumented indentation: Advances in understanding and; refinements to methodology," J. Mater. Res., vol. 19, No. 1, Jan. 3-20, 2004.
Singh, et al., "Ultrasound mediated Green Synthesis of Hexa-hydro Triazines," J. Mater. Environ. Sci. 2 (4) (2011) 403-406.
Stafford, et al., "A buckling-based metrology for measuring; the elastic moduli of polymeric thin films," Nature Materials Aug. 3, 2004, 545-550;Published online: Jul. 11, 2004.
Qipeng Guo, A new class of recyclable thermoset plastics, Phys Org, May 6, 2014, pp. 1-3.
List of IBM Patents or Patent Applications Treated as Related, dated Jun. 28, 2016.

HIGH-PERFORMANCE, FILLER-REINFORCED, RECYCLABLE COMPOSITE MATERIALS

CROSS-REFERENCE TO RELATED APPLICATIONS

This application is a division of U.S. patent application Ser. No. 14/571,501, filed on Dec. 16, 2014, which is a continuation of U.S. patent application Ser. No. 14/452,011, filed Aug. 5, 2014, now U.S. Pat. No. 9,255,172, issued Feb. 9, 2016. The aforementioned patent applications are herein incorporated by reference in their entirety.

INCORPORATION BY REFERENCE

Synthetic details and characterization of various example polyhexahydrotriazine and polyhemiaminal materials are provided in commonly assigned, U.S. Pat. No. 9,243,107, issued Jan. 26, 2016, resulting from application Ser. No. 14/050,995, filed in the USPTO on Oct. 10, 2013, the entirety of which is incorporated herein by reference.

BACKGROUND

The present disclosure relates to composite materials including filler components.

For many applications, filler materials are incorporated into polymeric materials to improve the mechanical strength or other characteristics of the polymeric material. For example, molded polymeric components may be "toughened" by incorporation of high-strength filler materials, such as carbon nanotubes or carbon fibers. Similarly, composite materials, such as glass-fiber reinforced plastic ("fiberglass") comprising a polymeric resin and a filler material, which may be a woven mat of fibers, have many applications. Typically, these molded components and composite materials use thermosetting polymeric resins, such as epoxy resins. However, the use of thermosetting resins make it generally difficult rework and/or recycle such molded components and composite materials because once "set" these resins are highly crosslinked and, thus, generally intractable. Because the resins are intractable, the filler materials are typically not recoverable. In many instances, it is desirable to recover filler materials for reuse since the fillers may be, for example, expensive or otherwise difficult to procure.

In general, a need exists for high-performance composite materials and molded components that are recyclable and/or re-workable.

SUMMARY

An exemplary polyhexahydrotriazine (PHT) resin comprises a plurality of trivalent hexahydrotriazine groups having the formula (1):

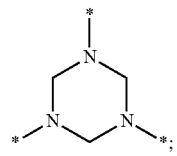

(1)

and
a plurality of divalent bridging groups of formula (2):

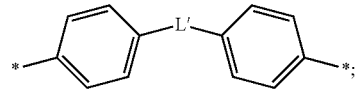

(2)

wherein L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon, each starred bond of a given hexahydrotriazine group is covalently linked to a respective one of the divalent bridging groups, and each starred bond of a given bridging group is linked to a respective one of the hexahydrotriazine groups.

PHT resins can be prepared by a method comprising: forming a reaction mixture comprising a i) solvent, ii) paraformaldehyde, and iii) a monomer comprising two primary aromatic amine groups; and heating the reaction mixture at a temperature of 150° C. to about 280° C.

Another method for forming PHT resins comprises: forming a first mixture comprising a i) solvent, ii) paraformaldehyde, and iii) a monomer comprising two primary aromatic amine groups; heating the first mixture at a temperature of about 20° C. to about 120° C., thereby forming a polyhemiaminal (PHA) resin; and then heating the PHA resin at a temperature of 150° C. to about 280° C., thereby forming a polyhexahydrotriazine (PHT) resin.

An exemplary polyhemiaminal (PHA) resin comprises a plurality of trivalent hemiaminal groups having the formula (3):

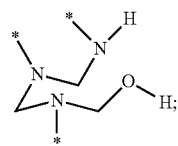

(3)

and
a plurality of divalent bridging groups of formula (2):

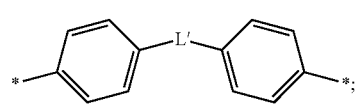

(2)

wherein again L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon, each starred bond of a given hemiaminal group is covalently linked to a respective one of the divalent bridging groups, and each starred bond of a given bridging group is linked to a respective one of the hemiaminal groups.

In an embodiment of the present disclosure, a composite material comprises a polyhexahydrotriazine (PHT) resin and a filler element that is covalently bonded to the PHT resin. As used herein, "filler element" may be, without limitation, a tube, rod, sphere, bead, particle, or fiber. When a fiber (or otherwise similar in structure to a fiber), the filler element may form a woven cloth, a mesh, a netting, a felt, or a mat, or a portion of the foregoing. The filler element may comprise, without limitation, cellulosic material, silica, silicates, clay, carbonaceous materials (e.g., carbon black, graphite, and fullerenes), and metallic compounds. Individual filler elements may be of any dimension, for example, nanoscale and macroscale. A composite material may comprise a mixture of several different filler elements having different shapes, compositions, and/or sizes.

In another embodiment of the present disclosure, a method of forming a composite material component includes forming a reaction mixture including a monomer comprising two primary aromatic amine groups and paraformaldehyde, placing the reaction mixture in contact with a filler element having a primary amine group covalently bonded thereto.

In a further embodiment of the present disclosure, a method of recycling a composite material component includes obtaining a composite material component including a PHT resin and a filler element that is covalently bonded to the PHT resin, exposing the composite material component to an acid, and optionally recovering the filler element.

The above-described and other features and advantages of the present invention will be appreciated and understood by those skilled in the art from the following detailed description, drawings, and appended claims.

DETAILED DESCRIPTION

Figure 1:
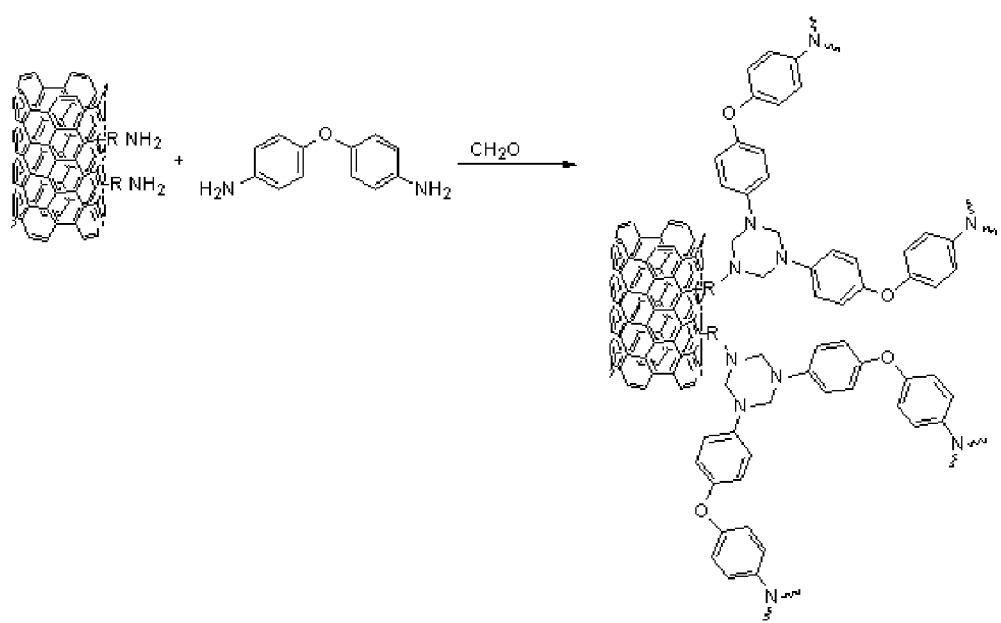
FIG. 1 depicts a reaction scheme for forming a composite material including a filler element covalently bonded to a polyhexahydrotriazine (PHT) resin.

Methods are disclosed for preparing polyhemiaminal (PHA) resins and polyhexahydrotriazine (PHT) resins by the reaction of aromatic amines, aromatic diamines, and paraformaldehyde. Aliphatic diamines may also be reacted in some embodiments.

PHA resins are stable intermediates in the preparation of the PHT resins. The PHA resins are generally prepared at a temperature of about 20° C. to about 120° C., more preferably at about 20° C. to about 100° C., and further preferably at about 40° C. to about 60° C. PHA resins can be cast from a polar aprotic solvents (e.g., N-methyl-2-pyrrolidone (NMP)), and PHA resins are stable at a temperature of about 20° C. to less than 150° C. The PHA resins can have a Young's modulus of about 6 GPa, which is exceptionally high for an organic polymeric resin. PHA resins are also melt processable as well so can be used to in molding and extrusion applications.

PHT resins can be formed by thermally treating a PHA resin at a temperature of at least 150° C., preferably about 165° C. to about 280° C., more preferably about 180° C. to about 210° C., and most preferably about 190° C. to about 210° C. for a period of time of about 1 minute to about 24 hours, and more preferably about 1 hour. PHT resins can have high heat resistance as measured by dynamic mechanical analysis (DMA). PHT resins can also have a high Young's modulus as measured by nanoindentation methods. In some instances, the Young's modulus of a PHT material can have a value in a range of about 8 GPa to about 14 GPa, exceeding that of bone (9 GPA).

PHT resins can also be formed in a more direct manner by the reaction of aromatic diamines and paraformaldehyde at temperatures greater than used in the formation of PHA resins, for example, at temperatures greater than 150° C. Under such conditions, the presumed PHA intermediary is not separately isolated.

Herein, a polyhemiaminal (PHA) resin is a crosslinked polymer comprising i) a plurality of trivalent hemiaminal groups of formula (3):

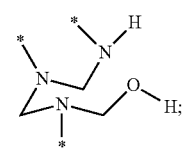

(3)

covalently linked to ii) a plurality of bridging groups of formula (4):

(4), wherein y' is 2 or 3, and K' is a divalent or trivalent radical comprising at least one 6-carbon aromatic ring. Herein, starred bonds represent attachment points to other portions of the chemical structure. Each starred bond of a given hemiaminal group is covalently linked to a respective one of the bridging groups. Additionally, each starred bond of a given bridging group is covalently linked to a respective one of the hemiaminal groups.

As an example, a polyhemiaminal can be represented herein by formula (5):

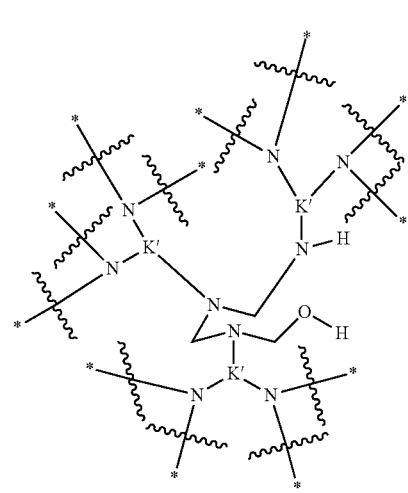

(5)

In this instance, each K' is a trivalent radical (y'=3) comprising at least one 6-carbon aromatic ring. It should be understood that each nitrogen having two starred wavy bonds in formula (5) is a portion of a different hemiaminal group.

In some embodiments, a polyhemiaminal (PHA) resin comprises, a plurality of trivalent hemiaminal groups having the structure (3):

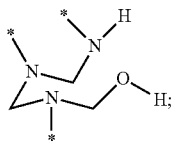

(3)

a plurality of bridging groups of formula (6):

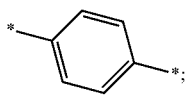

(6)

and
a plurality of monovalent end groups of formula (7):

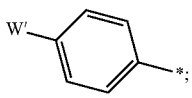

(7)

wherein W' is selected from the group consisting of: —H, —NH($R^1$), —N($R^2$)($R^3$), —OH, —O($R^4$), —S($R^5$), —P($R^6$), —$R^7$, —$CF_3$, and combinations thereof, wherein $R^1$ comprises at least 1 carbon, $R^2$ comprises at least 1 carbon, $R^3$ comprises at least 1 carbon, $R^4$ comprises at least 1 carbon, $R^5$ comprises at least 1 carbon, $R^6$ comprises at least 1 carbon, $R^7$ comprises at least one carbon, and each of $R^1$-$R^7$ may be independent or the same. Each starred bond of a given hemiaminal group is covalently linked to a respective one of the bridging groups or a respective one of the monovalent end groups. Each starred bond of a given bridging group is linked to one of the hemiaminal groups. And each starred bond of a given monovalent end group is linked to one of the hemiaminal groups.

As an example, a polyhemiaminal resin covalently bonded to a filler element can be represented herein by formula (8):

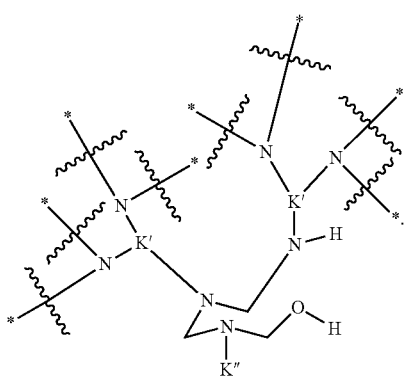

(8)

In this instance, each K' is a trivalent radical (y'=3) comprising at least one 6-carbon aromatic ring and K" is a linking group covalently attached to the filler element. It should be understood that each nitrogen atom having two starred wavy bonds in formula (8) is a portion of a different hemiaminal group. The inclusion of K" reduces the number of potential crosslink connection points in the polyhemiaminal resin network; however the resin network is covalently bonded to filler element via the linking group K". Covalent incorporation of the filler element into the resin network is important for achieving improved composite material properties such as increased mechanical strength or rigidity because any separation or gap between filler and resin (binder) provides a potential crack or failure initiation point in the material. K" may include, for example, at least one carbon. In some embodiments, K" may be a six carbon alkyl chain.

Non-limiting exemplary trivalent bridging groups include:

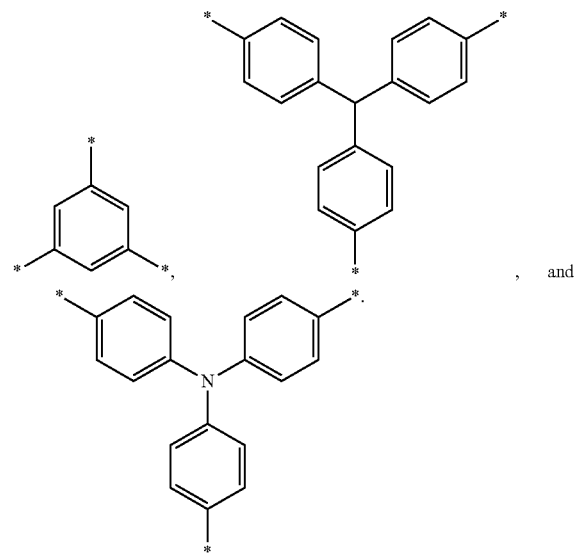

, and

The bridging groups can be used singularly or in combination. The remainder of the description discusses divalent bridging groups K'. It should be understood that the methods and principles below also apply to trivalent linking groups.

Polyhemiaminals composed of divalent bridging groups K' and monovalent end groups K" can be represented herein by formula (9):

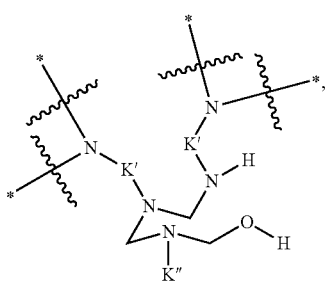

(9)

wherein K' is a divalent radical (y'=2) comprising at least one 6-carbon aromatic ring, and K" is and K" is a linking group covalently attached to the filler element. Each nitrogen atom having two starred wavy bonds in formula (9) is a portion of a different hemiaminal group. The inclusion of K" reduces the number of potential crosslink connection points in the polyhemiaminal resin network; however the resin network is covalently bonded to filler element via the K" linking group. Covalent incorporation of the filler element into the resin network is important for achieving improved composite material properties such as increased mechanical strength or rigidity because any separation or gap between filler and resin (binder) provides a potential crack or failure initiation point in the material. K" may include, for example, at least one carbon. In some embodiments, K" may be a six carbon alkyl chain.

Certain bridging groups K' have the formula (10):

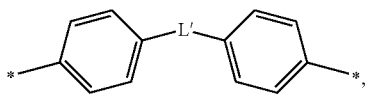

(10)

wherein L' is a divalent linking group selected from the group consisting of *—O—*, *—S—*, *—N(R')—*, *—N(H)—*, *—R"—*, *—P(R'")—* and combinations thereof, wherein R', R", and R'" independently comprise at least 1 carbon. In an embodiment, R', R", and R'" are independently selected from the group consisting of methyl, ethyl, propyl, isopropyl, phenyl, and combinations thereof. Other L' groups include methylene (*—CH$_2$—*), isopropylidenyl (*—C(Me)$_2$-*), and fluorenylidenyl:

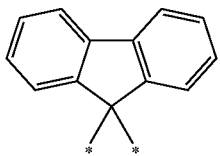

Also, as described above, a bridging group can also be of the formula (11):

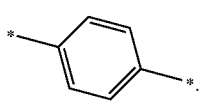

(11)

Polyhemiaminal resin networks composed of divalent bridging groups of formula (11) and filler element linking groups K" can be represented herein by formula (12):

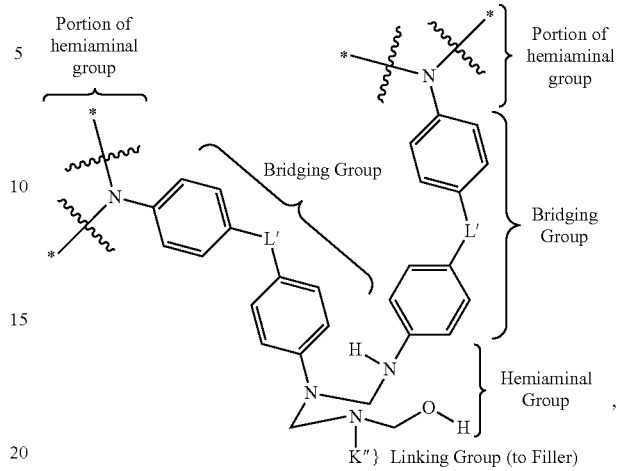

(12)

wherein L' is a divalent linking group selected from the group consisting of *—O—*, *—S—*, *—N(R')—*, *—N(H)—*, *—R"—*, *—P(R'")—* and combinations thereof, wherein R', R", and R'" independently comprise at least 1 carbon. K" is a linking group covalently bonded to a filler element. Each nitrogen atom having two starred wavy bonds in formula (12) is a portion of a different hemiaminal group.

An embodiment of a polyhexahydrotriazine (PHT) composite resin, comprises, i) a plurality of trivalent hexahydrotriazine groups of formula (13):

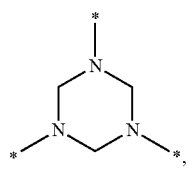

(13)

covalently linked to ii) a plurality of divalent bridging groups of formula (14):

K'—(—*)$_{y'}$ (where y'=2 or 3)    (14);

and iii) a plurality of linking groups K" of formula (15):

K"—*    (15),

Each starred bond of a given hexahydrotriazine group is covalently linked to a respective one of the bridging groups K' or a respective one of the linking groups K". K' is a divalent or trivalent radical comprising at least one 6-carbon aromatic ring, and K" is linking group covalently bonded to a filler element. In an embodiment, K" includes at least one carbon atom. In another embodiment, K" is an alkyl chain including at least six carbon atoms. Each starred bond of a given bridging group or a given linking group is covalently linked to a respective one of the hexahydrotriazine groups.

For PHTs comprising bridging groups of formula (14) and linking groups K", the polyhexahydrotriazine composite resin is represented herein by formula (16):

(16)

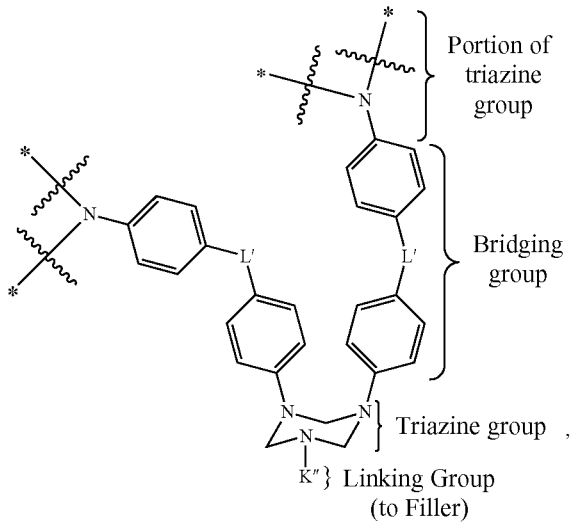

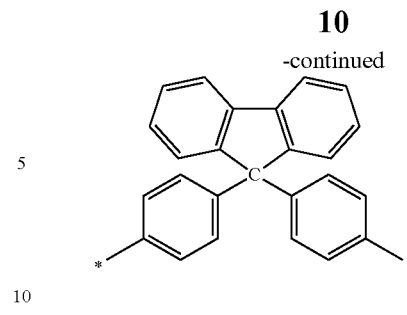

and combinations thereof.

The PHA and PHT resins can further comprise monovalent aromatic groups (referred to herein as diluent groups), which do not participate in chemical crosslinking and therefore can serve to control the crosslink density as well adjust the physical and mechanical properties of the PHA and PHT resins. Monovalent diluent groups have a structure according to formula (17), formula (18), formula (19), and/or formula (20):

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. K" is again linking group covalently bonded to a filler element. Each nitrogen having two starred wavy bonds in formula (16) is a portion of a different hexahydrotriazine group.

Exemplary non-limiting divalent bridging groups include:

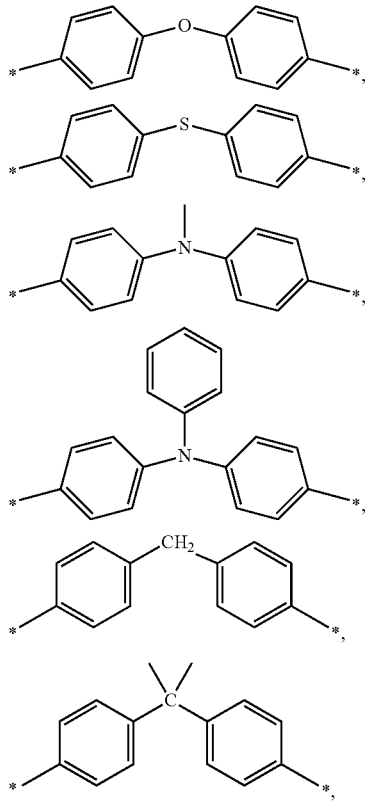

(17)

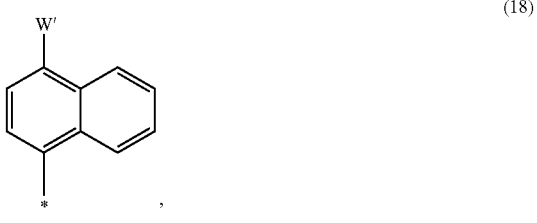

(18)

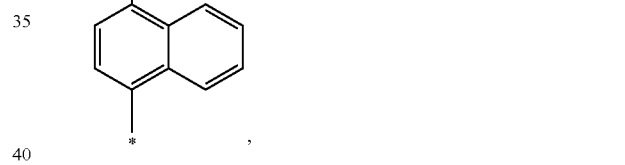

(19)

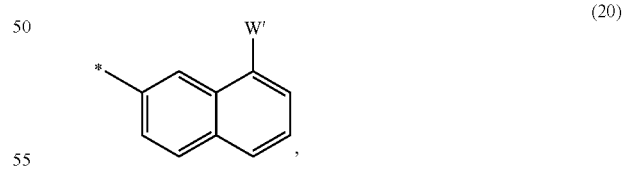

(20)

wherein W' is selected from the group consisting of: —H, —NH($R^1$), —N($R^2$)($R^3$), —OH, —O($R^4$), —S($R^5$), —P($R^6$), —$R^7$, —$CF_3$, and combinations thereof, wherein $R^1$ comprises at least 1 carbon, $R^2$ comprises at least 1 carbon, $R^3$ comprises at least 1 carbon, $R^4$ comprises at least 1 carbon, $R^5$ comprises at least 1 carbon, $R^6$ comprises at least 1 carbon, $R^7$ comprises at least one carbon, and each of $R^1$-$R^7$ may be independent or the same. The starred bond is linked to a nitrogen of a hemiaminal group or a nitrogen of a hexahydrotriazine group.

Non-limiting exemplary diluent groups include:

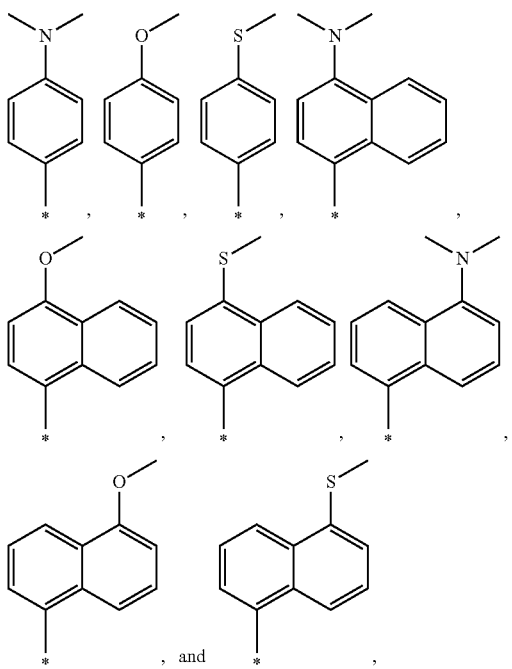

wherein the starred bond is linked to a nitrogen of a hemiaminal group or a hexahydrotriazine group. Diluent groups can be used singularly or in combination.

The reactivity of a given diluents (end group precursor) may vary according to whether the substituent(s) attached to aromatic ring are electron rich or electron poor. In general, more strongly electron withdrawing (electron poor) substituents reduce reactivity of the monomer and more strongly electron donating (electron rich) substituents increase reactivity. As such, it is possible to control the ratio of different end groups in the final product by selecting end group precursors on the basis of expected reactivity (and/or adjusting feed ratios). Additionally, electron poor substituents react more slowly and can be used to vary the character of the reaction end-product between hemiaminal and hydrotriazine. That is, less reactive (electron poor) monomer units will tend produce a reaction product having more hemiaminal groups as compared to more reactive (electron rich) monomer units.

The ratio of bridging groups and end groups in the final resin can similarly be adjusted using the relative reactivity of the bridging group monomers and the end group monomers. A more reactive end group (e.g., one with a substituent which is electron rich) will tend to reduce cross-link density and molecular weight in the final resin. A less reactive end group (e.g., one with a substituent which is electron poor) will tend to increase crosslink density because fewer hemiaminal or hexahydrotriazine groups will bond to such an end group and will instead be bonded only to bridging groups, which results in crosslinks.

PHA Composite Materials

A method of preparing a polyhemiaminal (PHA) composite material including divalent bridging groups comprises steps of: forming a first mixture comprising: i) a first monomer comprising two or more primary aromatic amine groups (e.g., corresponding to K' with primary amines (—NH$_2$) at the * locations)), ii) (optionally) a second monomer having only one aromatic primary amine group (i.e., a diluent group), iii) paraformaldehyde, and iv) a solvent. The first mixture is then preferably heated at a temperature of about 20° C. to about 120° C. for about 1 minute to about 24 hours, in the presence of primary amine surface-functionalized filler element, thereby forming a second mixture including a PHA composite material with a covalently bonded filler element therein.

The mole ratio of paraformaldehyde to total moles of primary aromatic amine groups (e.g., 2×moles diamine monomer+1×moles monoamine monomer+1×primary amine reaction sites on the filler element) is preferably about 1:1 to about 1.25:1, based on one mole of paraformaldehyde equal to 30 grams.

Non-limiting exemplary first monomers comprising two primary aromatic amine groups include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

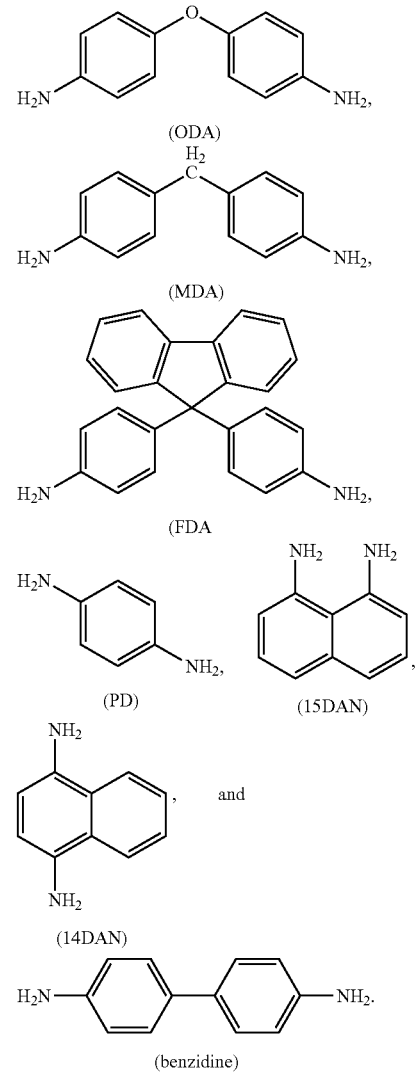

Non-limiting exemplary second monomers having only one primary amine include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

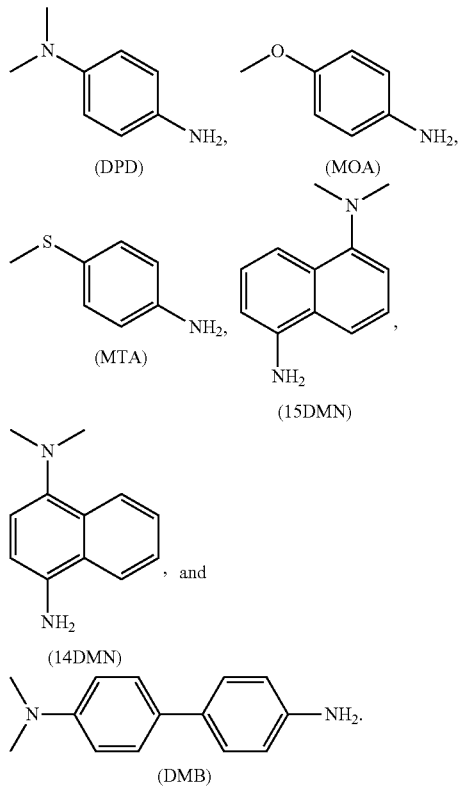

The second monomer is optional can be used in an amount of 0 mole % to about 99 mole % based on total moles of first monomer and second monomer. In a particular embodiment, the second monomer can be used in an amount of 10 mole % to about 67 mole % based on total moles of first monomer and second monomer.

The solvent can be any suitable solvent. Preferred solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), propylene carbonate (PC), and propylene glycol methyl ether acetate (PGMEA). In a typical embodiment, the solvent is NMP.

PHT Composite Materials

A method of preparing a polyhexahydrotriazine (PHT) comprises forming a first mixture comprising i) a first monomer comprising two aromatic primary amine groups, ii) (optionally) a second monomer having only one aromatic primary amine group, iii) paraformaldehyde, and iv) a solvent, and heating the first mixture at a temperature of at least 150° C., preferably about 165° C. to about 280° C., in the presence of a primary amine surface-functionalized filler element, thereby forming a second mixture comprising PHT composite material with a covalently bonded filler element therein. The heating time at any of the above temperatures can be for about 1 minute to about 24 hours.

Alternatively, the PHT composite material can be prepared by heating a PHA composite material (prepared as described above) at a temperature of at least 150° C., preferably about 165° C. to about 280° C. even more preferably at about 180° C. to about 220° C., and most preferably at about 200° C. for about 1 minute to about 24 hours.

FIG. 1 depicts a reaction scheme for forming a composite material including a filler element covalently bonded to a polyhexahydrotriazine (PHT) resin. As depicted in FIG. 1, the filler element is a single-wall, carbon nanotube. This nanotube, at an initial stage, has primary amine groups covalently linked thereto via a linking group "R." In this example, "R" includes at least one carbon atom. More specifically, in this example, "R" is a six carbon, straight alkyl chain. Reactivity of the primary amine groups may be somewhat reduced for shorter chain linking groups. ODA is selected as the divalent bridging group. Reaction of ODA with paraformaldehyde in the presence of the functionalized nanotube under the conditions discussed above results in the formation of a PHT composite material. Though the filler element is depicted with two primary amine reaction sites, this is for purposes of explanation. The number of reaction sites per filler element is not limited to two sites and may be any suitable number greater than or equal 1. It would be expected for the total number of sites to vary with such things as desired end-use properties of the composite material, the size of the filler element, the reactivity of the reaction sites, and the like.

Figure 2:
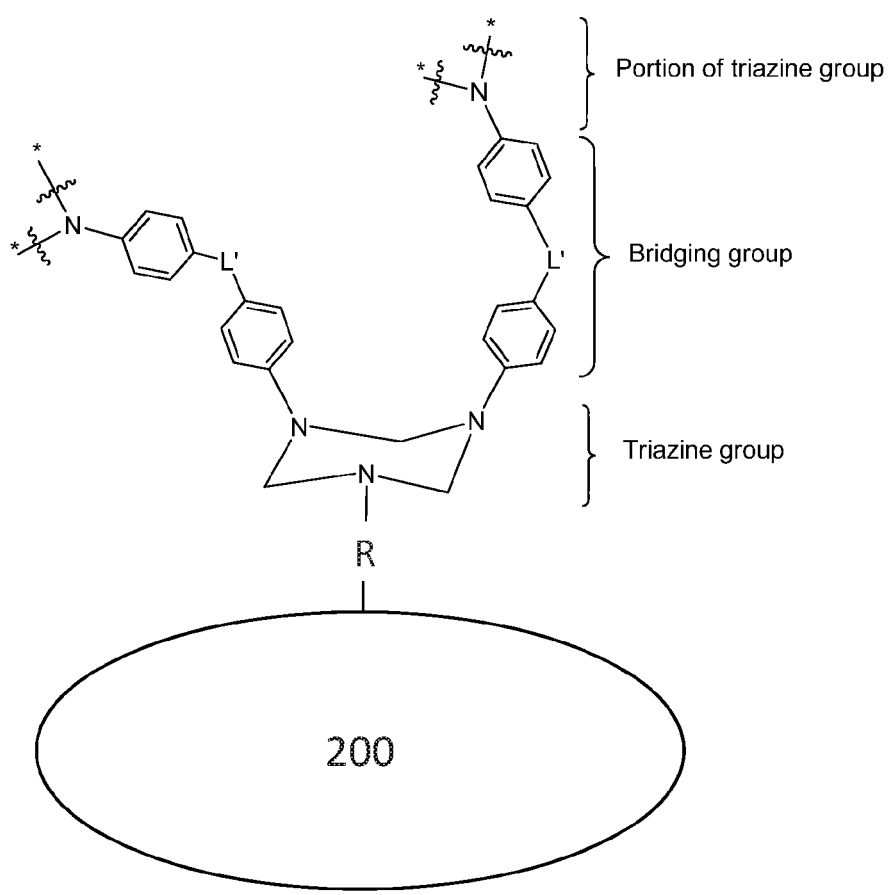
FIG. 2 depicts a filler element covalently bonded to a polyhexahydrotriazine (PHT) resin.

FIG. 2 depicts a PHT composite material including a filler element 200 covalently bonded into a polyhexahydrotriazine (PHT) resin. Filler element 200 may be, without limitation, a tube, rod, sphere, bead, particle, or fiber. When a fiber (or otherwise similar in structure to a fiber), the filler element may form a woven cloth, a mesh, a netting, a felt, or a mat, or a portion of the foregoing. The filler element may comprise, without limitation, cellulosic material, silica, silicates, clay, carbonaceous materials (e.g., carbon black, graphite, and fullerenes), and metallic compounds. In some embodiments, the filler element may comprise carbon-containing materials such as carbon nanotubes, carbon fibers, fullerenes, and woven mats. In other embodiments, the filler element may comprise silica-containing filler materials, including silica spheres and silica fibers. In additional embodiments, the filler element may comprise inorganic filler materials, such as silica, alumina, titanium dioxide. Individual filler elements may be of any dimension, for example, nanoscale and macroscale. A composite material may comprise a mixture of several different filler elements having different shapes, compositions, and/or sizes. Amine-modified fillers are available commercially and/or may be produced according to methods known in the art.

As depicted in FIG. 2, the PHT resin is a material including a divalent bridging group wherein L' is a divalent linking group selected from the group consisting of *—O—*, *—S—*, *—N(R')—*, *—N(H)—*, *—R"—*, and combinations thereof, wherein R' and R" independently comprise at least 1 carbon. However, in general, the PHT resin (binder) in a PHT composite material may be any of PHTs disclosed or suggested herein. Similarly, in other embodiments, the PHT resin (binder) in FIG. 2 may be replaced with a PHA material disclosed or suggested herein.

In some embodiments, the filler element may be covalently linked to the binder resin by placing the filler element in contact with a reaction mixture, which may include a solvent, a diamine monomer, and paraformaldehyde. In other embodiments, the filler element may be covalently linked to the binder resin by melt mixing PHA/PHT resins and the filler element at elevated temperatures without use or presence of a solvent.

Applications of Composite Materials

The PHA and PHT composite materials are attractive for applications requiring lightweight, rigid, strong, heat resistant components such as aerospace engineering, automotive components, electronics, or the like. In general, PHT materials have unique combinations of properties that include high modulus, solvent resistance, heat resistance/insensitivity, resistance to stress fracture/cracking. Additionally, unlike most thermosetting materials, PHA/PHT materials can be reverted to monomer via treatment with an acid. This allows PHA/PHT composite materials (or components formed by these materials) to be reworked or recycled to starting materials.

Figure 3:
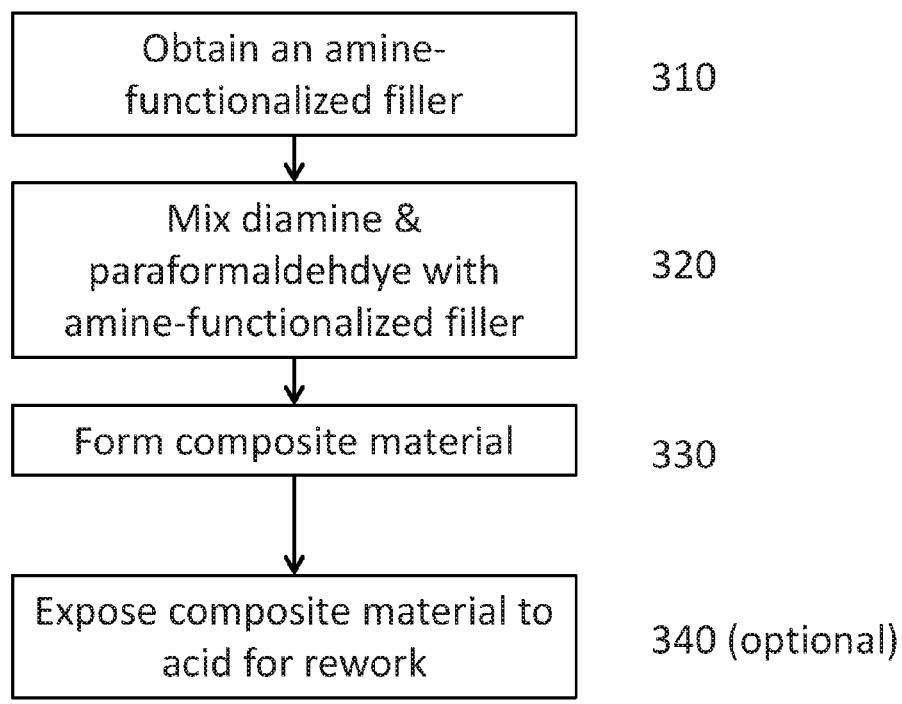
FIG. 3 depicts a method of forming a composite material component.

FIG. 3 depicts a method of forming a composite material component according to an embodiment.

In element 310, a primary amine functionalized filler element (e.g., filler element 200) is obtained. The filler element may have been previously functionalized or it may be functionalized at this time.

In element 320, a PHA/PHT precursor ("first monomer" such as ODA or PD) is mixed with paraformaldehyde (PF) and the functionalized filler element to form a reaction mixture. Optional diluents groups ("second monomer") and a solvent may also be included in the reaction mixture.

In element 330, heating and/or molding of the reaction mixture is used to form a composite component. Heating of the reaction mixture causes the composite material to set—that is, a crosslinked resin material is formed and the filler element is covalently bonded to this resin material. Element 330 may occur in stages. For example, the reaction mixture may be heated to a first temperature to cause a PHA composite material to form, then this reaction product may be processed (cast, molded, injected, formed, etc.) to form the composite component into the desired shape or structure. After such processing (or during such processing) the PHA composite material may be heated to a second temperature at which the PHA composite material converts to a PHT composite material. Alternatively, the heating and molding may occur in a single stage and a composite component formed of a PHT composite material may be fabricated directly.

In optional element 340, the composite component may be exposed to an acid and reworked. In this context, "reworked" means that if this composite component is misshaped or positioned in an incorrect location, the composite component can be reshaped or removed from incorrect locations by exposure to an acid, rather than scrapping the entire composite component. In general, when a thermosetting resin, such as an epoxy resin is used in a composite component, it is not possible to rework the composite component after the epoxy resin sets. However, PHA and PHT materials can revert to monomer components upon exposure to acids (e.g., $H_2SO_4$, acetic acid).

Figure 4:
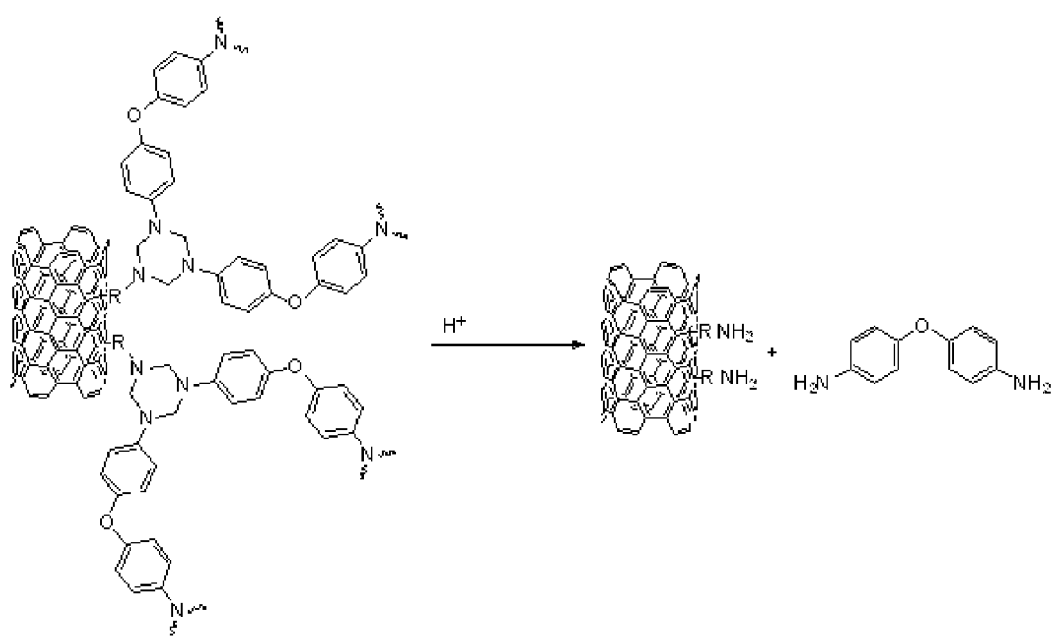
FIG. 4 depicts a scheme for recycling a composite material component including a filler element covalently bonded to a polyhexahydrotriazine (PHT) resin.

FIG. 4 depicts a scheme for recycling a composite material component including a filler element covalently bonded to a polyhexahydrotriazine (PHT) resin. The PHT composite material formed according to the scheme depicted in FIG. 2, reverts to starting materials (i.e., "first monomer" and carbon nanotube) upon exposure to an acid. The breakdown of the composite material by this method allows for reworking, recycling, and disposal of composite components formed using PHT binder resins. Traditional means for recycling or disposing of thermoset composite components uses mechanical grinding or thermal degradation. These methods do not return the composite component to reusable starting materials. In many applications, it would be desirable to recover and reuse filler elements, which may be high value materials, such as carbon nanotubes (or other fullerene molecules). The presently disclosed materials and methods allow for the recovery of high value filler elements.

Figure 5:
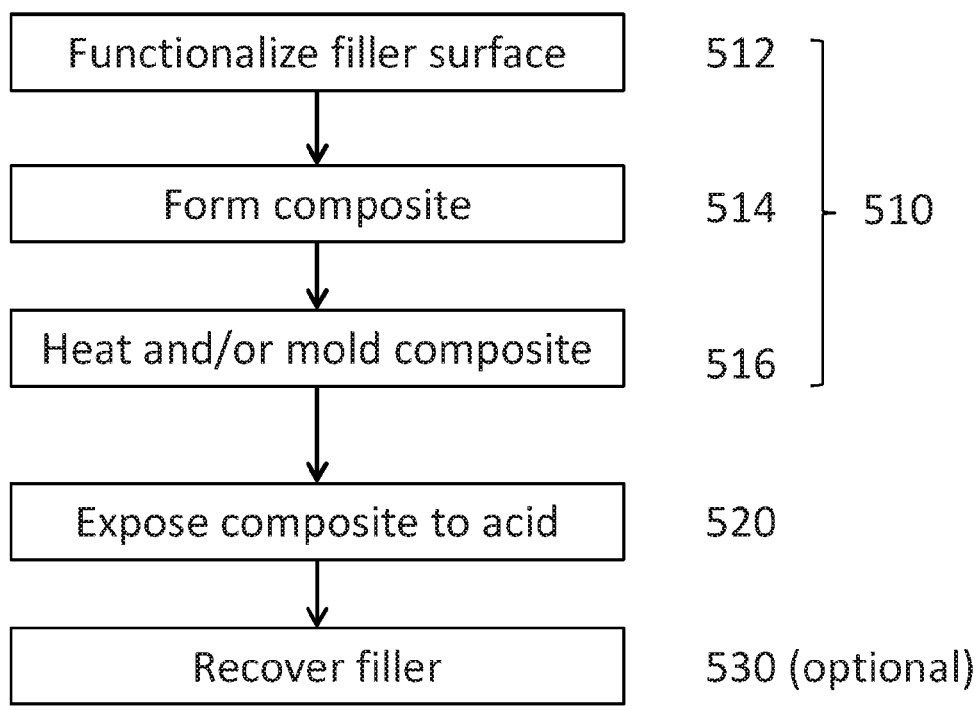
FIG. 5 depicts a method for recycling a composite material component including a filler element covalently bonded to a polyhexahydrotriazine (PHT) resin.

FIG. 5 depicts a method for recycling a composite material component including a filler element covalently bonded to a polyhexahydrotriazine (PHT) resin.

In element 510, a composite material component including a filler element covalently bonded to a PHT resin is obtained. In this embodiment, the composite component is formed by a process comprising elements 512, 514, and 516. In this process, a filler element's surface is functionalized with a primary amine group (512), the functionalized filler and PHA/PHT precursor materials (e.g., "first monomer" and "second monomer" disclosed above) are mixed and reacted to form a composite material (514), the composite material is heat and/or molded to form a composite component (516). In other embodiments, element 510 may simply be obtaining an already formed composite component. For example, the composite component may be a discarded or obsolete component from an automobile being scrapped. In other embodiments, element 514 and element 516 can occur simultaneously such that the composite material and the molded component are formed in a single processing step. Element 514 can also comprise a melt mixing process in which the binder resin (or the binder resin in a pre-polymer or low molecular weight initial state) is mixed with the functionalized filler to provide the composite material.

In element 520, the composite component is exposed to an acid and consequently reverted to starting materials (i.e., the PHA/PHT precursors and the functionalized filler), such as, depicted in FIG. 4.

In element 530, the filler element may be optionally recovered for reuse or special disposal processing. The recovery process may involve, for example, a centrifuge process, solvent extraction, evaporative distillation, or other separation techniques. When the filler material is nanoparticles or the like, special disposal processing may be implemented so as to avoid release of nanoparticle filler elements into the environment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A method of recycling a composite component, comprising:
   obtaining a composite component including:
      a polyhexahydrotriazine (PHT) resin; and
      a filler element covalently bonded to the PHT resin; and
   exposing the composite component to an acid.

2. The method of claim 1, further comprising:
   recovering the filler element.

3. The method of claim 1, wherein the filler element is a nanoparticle.

4. The method of claim 1, wherein the filler element is a carbon fiber.

5. The method of claim 1, wherein the filler element is a glass fiber.

6. The method of claim 1, wherein the filler element is a single-wall nanotube.

7. The method of claim 1, wherein the filler element is a fullerene.

8. The method of claim 1, wherein the PHT resin comprises:
   a plurality of trivalent hexahydrotriazine groups having the structure:

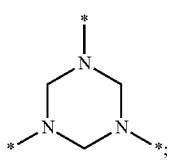

and
   a plurality of divalent bridging groups of formula:

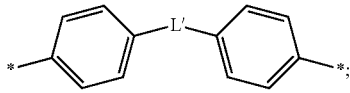

wherein L' is a divalent linking group selected from the group consisting of —O—, —S—, —N(R')—, —N(H)—, —R"—, and combinations thereof, wherein R' comprises at least 1 carbon and R" comprises at least one carbon, each starred bond of a given hexahydrotriazine group is covalently linked to a respective one of the divalent bridging groups or the filler element, and each starred bond of a given bridging group is linked to a respective one of the hexahydrotriazine groups.

9. The method of claim 8, wherein L' is one of —O— or —S—.

10. The method of claim 8, wherein L' is —N(R')—, wherein R' is selected from the group consisting of methyl, ethyl, propyl, isopropyl, phenyl, and combinations thereof.

11. The method of claim 8, wherein L' is —CH$_2$—.

12. The method of claim 8, wherein L' is 9-fluorenylidenyl.

13. The method of claim 8, wherein the PHT resin includes a trivalent bridging group.

14. The method of claim of claim 8, wherein the PHT resin includes least one diluent group selected from the group consisting of

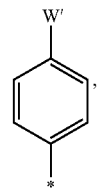

and combinations thereof, wherein W is a monovalent radical selected from the group consisting of —H, —NH(R$^1$), —N(R$^2$)(R$^3$), —OH, —O(R$^4$), —S(R$^5$), —P(R$^6$), —R$^7$, —CF$_3$, and combinations thereof, wherein R$^1$, R$^2$, R$^3$, R$^4$, R$^5$, R$^6$, and R$^7$ each comprise at least 1 carbon and each of R$^1$-R$^7$ may be independent or the same, and the starred bond in each of the at least one diluents group linked to a nitrogen of a hexahydrotriazine group of the PHT resin.

15. A method of recycling a composite component, comprising:
   obtaining a composite component including:
      a polyhexahydrotriazine (PHT) resin; and
      a carbon nanotube covalently bonded to the PHT resin; and
   exposing the composite component to an acid.

16. The method of claim 15, further comprising:
   recovering the carbon nanotube.

17. The method of claim 15, wherein the PHT resin comprises:
   a plurality of trivalent hexahydrotriazine groups having the structure:

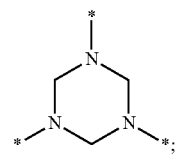

and
   a plurality of divalent bridging groups of formula:

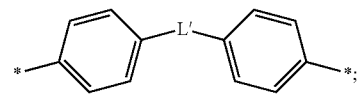

wherein L' is a divalent linking group selected from the group consisting of —O—, —S—, —N(R')—, —N(H)—, —R"—, and combinations thereof, wherein R' comprises at least 1 carbon and R" comprises at least one carbon, each starred bond of a given hexahydrotriazine group is covalently linked to a respective one of the divalent bridging groups or the filler element, and each starred bond of a given bridging group is linked to a respective one of the hexahydrotriazine groups.

* * * * *